MIDPOINT CONDUCTOR DRIVE AND SENSE IN A MAGNETIC MEMORY

Filed June 5, 1963 2 Sheets-Sheet 1

INVENTORS:
HIROSHI AMEMIYA,
THOMAS R. MAYHEW &
RICHARD L. PRYOR
BY
Carl V. Olson
Attorney INVENTORS:
HIROSHI AMEMIYA,
THOMAS R. MAYHEW &
RICHARD L. PRYOR
BY
Carl V. Olson
Attorney

United States Patent Office 3,319,233

Patented May 9, 1967

3,319,233

MIDPOINT CONDUCTOR DRIVE AND SENSE IN A MAGNETIC MEMORY

Hiroshi Amemiya and Thomas R. Mayhew, Levittown, and Richard L. Pryor, Haddonfield, N.J., assignors to Radio Corporation of America, a corporation of Delaware Filed June 5, 1963, Ser. No. 285,782
5 Claims. (Cl. 340—174)

This invention relates to memories, and particularly to arrangements for coupling digit drivers and sense amplifiers to digit and sense conductors linking memory elements in a memory array.

Limitations on the speed with which a memory, such as a magnetic core memory, can be operated in the storage and retrieval of information are the time required for a digit pulse to travel along a digit conductor linking memory elements of an array, the time required for digit pulses on the conductor to die down enough to permit a reading operation, and the time required for a sense signal induced on a digit conductor from the most distant memory element to reach the sense amplifier. The time required for digit pulse disturbances to die down can be reduced by terminating each end of a digit conductor with the characteristic impedance of the line formed by the conductor and the linked memory elements and adjacent elements.

The propagation delay of digit pulses and sense signals on a digit conductor is undesirably long in a large memory since the digit conductor links a memory element of every word location in the memory. This propagation delay not only limits the operation speed of the memory but it also complicates the electronics of the system due to the fact that read and write word pulses applied to word conductors must be variably timed so that coincidence of write pulses and digit pulses occurs at memory elements at all points along the length of the digit conductors, and further so that there is coincidence of sense amplifier strobe pulses and sense signals from memory elements at all points along the length of the digit conductors.

It is therefore a general object of this invention to provide an improved arrangement for coupling digit drivers and sense amplifiers to digit conductors to significantly reduce the undesirable effects of propagation delays of pulses and signals on the digit conductors.

In accordance with an example of the invention, there is provided a "two-core-per-bit" memory including a plurality of digit conductors arranged in pairs, each conductor being terminated at both ends in the characteristic impedance. Pairs of memory elements each include one memory element linked by one conductor of a digit conductor pair and another memory element linked by the other conductor of the digit conductor pair. Word conductors each link both memory elements of a memory element pair. A differential sense amplifier is provided for each digit conductor pair and has one input coupled to the midpoint of one conductor of the digit conductor pair and has another input coupled to the midpoint of the other conductor of the pair. "1" and "0" digit drivers are also provided for each digit conductor pair and are coupled to the midpoints of the two conductors of the respective pair.

Figure 1:
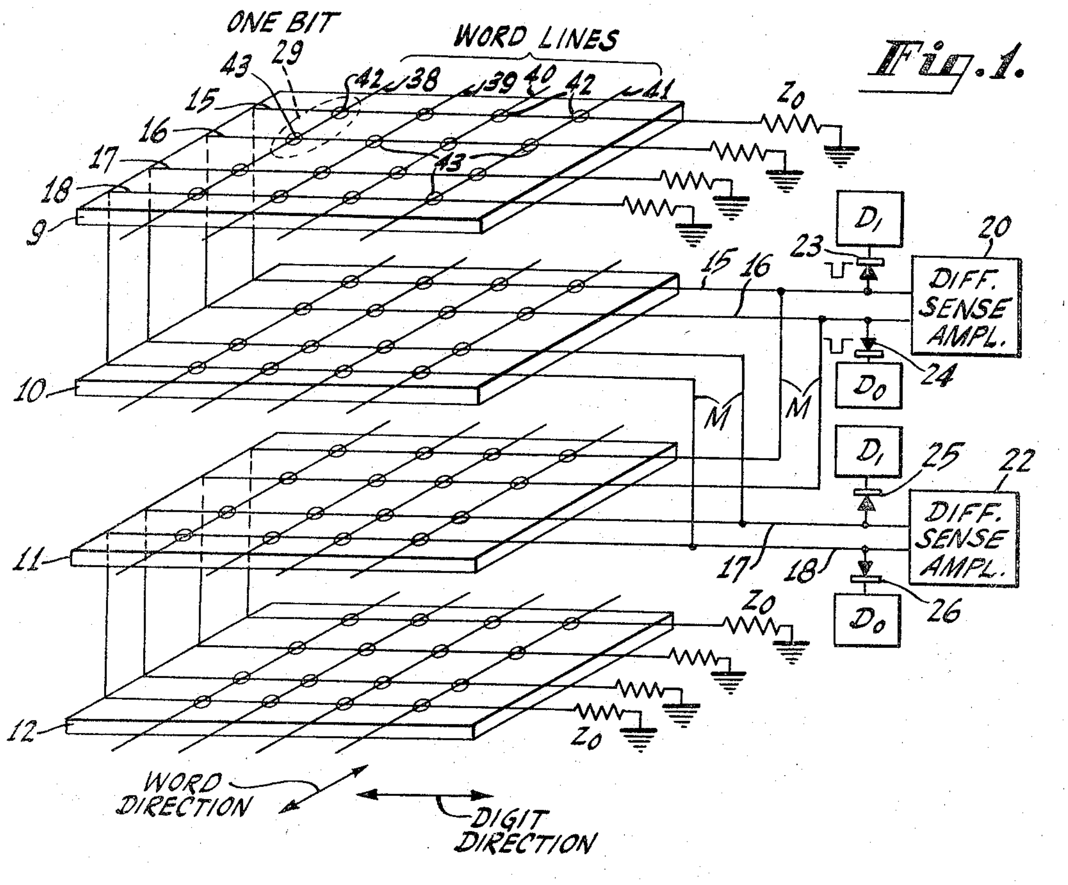
FIG. 1 is a schematic representation of a "two-core-per-bit" memory arrangement, according to the invention, which shows means for the storage of sixteen words of two bits each and which is illustrative of arrangements for the storage of a much larger number of words each having a much larger number of bits.

Referring now in greater detail to FIG. 1, there is shown a memory stack having four memory planes 9, 10, 11 and 12 each provided with an array of pairs 29 of memory elements 42, 43 arranged in digit rows and word columns. Digit conductors 15, 16, 17 and 18 link memory elements along corresponding rows on all four planes. Each of the two ends of each digit conductor is connected through a respective terminating resistor $Z_0$ having the characteristic impedance of the line to a point of reference potential such as ground. The conductors 15 and 16 constitute a digit conductor pair, and the conductors 17 and 18 constitute another digit conductor pair.

The midpoints M of the digit conductors 15 and 16 are connected to respective inputs of a differential sense amplifier 20. Similarly, the midpoints M of the two conductors of the digit conductor pair 17, 18 are connected to respective inputs of a different sense amplifier 22. The midpoint of digit conductor 15 is connected through a diode 23 to a "1" digit driver $D_1$, and the digit conductor 16 is connected through a diode 24 to a "0" digit driver $D_0$. Similarly, the midpoints of digit conductors 17 and 18 are connected through respective diodes 25 and 26 to respective "1" and "0" digit drivers $D_1$ and $D_0$.

Plane 9 is also provided with column word lines 38, 39, 40 and 41. Planes 10, 11 and 12 are similarly provided with word lines. Each of the word lines on each of the four planes is coupled to a respective read-write word driver means (not shown).

A memory element, such as a magnetic core, is located at every crossover of a digit row conductor and a word column conductor. Two memory elements 42, 43 linked by one word conductor and linked respectively by two conductors of a digit conductor pair are used for the storage of one information bit. For example, one information bit is stored in the two memory elements 29 located at the crossovers of the word conductor 38 with the two conductors 15 and 16 of the digit conductor pair 15, 16.

Figure 2:
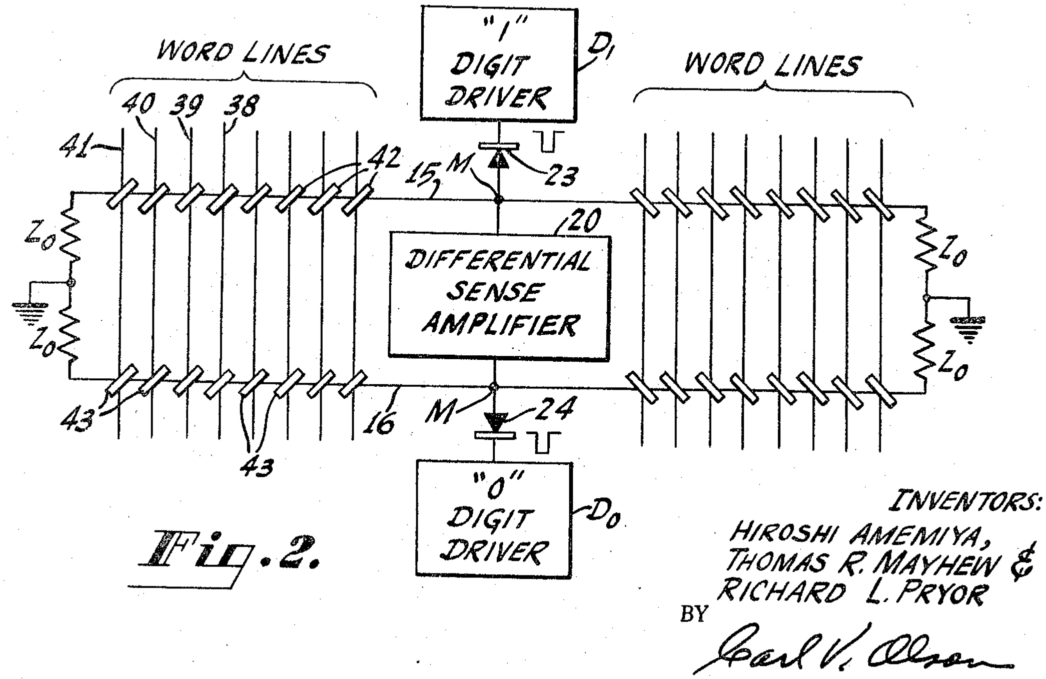
FIG. 2 is a diagram showing one digit conductor pair of the arrangement of FIG. 1.

FIG. 2 shows the one digit conductor pair 15, 16 of FIG. 1 together with memory elements and circuits to which they are connected. The digit conductor 15 links memory elements 42 and digit conductor 16 links memory elements 43. Two memory elements 42 and 43 linked by a single word conductor are used for the storage of a single bit of information. FIG. 2 clearly illustrates the connections of the midpoints M of the digit conductors 15 and 16 to respective digit drivers $D_1$ and $D_0$, and to respective inputs of the differential sense amplifier 20.

Figure 3:
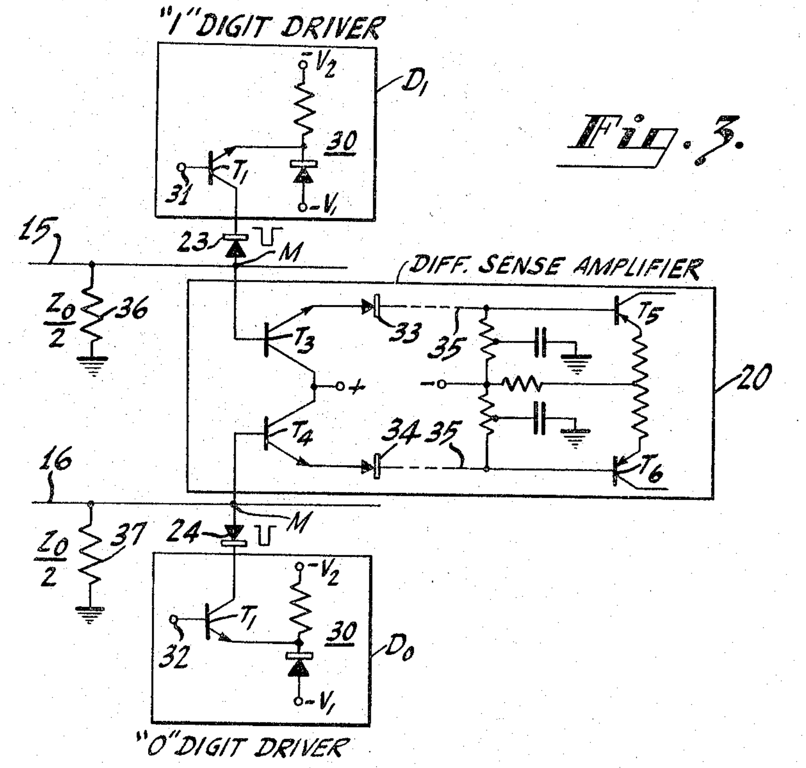
FIG. 3 is a circuit diagram showing the output circuits of digit drivers and the input circuit of the differential sense amplifier in the arrangement of FIG. 2.

FIG. 3 shows the output circuits of the digit drivers $D_1$ and $D_0$, and the input circuit of the differential sense amplifier 20. The output circuit of the digit driver $D_1$ includes a transistor $T_1$ connected in a current switching circuit to provide a negative digit driver pulse through the diode 23 to the digit conductor 15. The output circuit of digit driver $D_0$ is the same. The bias networks 30 in the digit drivers $D_1$ and $D_0$ may be constituted by a single bias network which is common to both digit drivers. Digit driver $D_1$ supplies a negative pulse to digit conductor 15 when an energizing pulse is supplied to the terminal 31 and the digit driver $D_0$ supplies a negative digit pulse to the digit conductor 16 when an energizing pulse is applied to the terminal 32.

The input circuit of the differential sense amplifier 20 shown in FIG. 3 includes transistors $T_3$ and $T_4$ connected as emitter followers. The emitters are connected through respective diodes 33 and 34 and a transmission line 35 to respective transistors $T_5$ and $T_6$. The components to the left of the transmission line 35 as viewed in FIG. 3 are located close to the memory elements, and the components to the right of the transmission line 35 are located at a distance from the memory elements where sufficient space is available.

The described output circuits of drivers $D_1$ and $D_0$ and the input circuit of sense amplifier 20 present high impedances to the midpoints of digit conductors 15 and 16. The impedances presented are very high relative to the characteristic impedance of a digit conductor and the memory elements linked thereby and the other adjacent elements. Each digit conductor may have a characteristic impedance of about 300 ohms, and the terminal ends of digital conductors are preferably terminated by resistors $Z_0$ having this value of resistance. The midpoints M of the digit lines may be returned to ground through respective resistors 36 and 37 having a value equal to one-half of the characteristic impedance of the lines, or more.

In the operation of the digit-sense arrangement of FIGS. 1, 2 and 3, the writing of a "1" information bit into a memory location is accomplished by simultaneously energizing one of the word conductors from a word driver (not shown), and a digit conductor 15 from the "1" digit driver $D_1$. The writing of a "0" in the bit location is accomplished by energizing the word line at the same time as a digit pulse is applied to the digit conductor 16 by the digit driver $D_0$. In either case, the digit driver supplies a current pulse to the midpoint M of the respective digit conductor so that the digit pulse is propagated in both directions from the midpoint to the terminating resistors at the two ends of the digit conductor. The digit pulses are absorbed in the terminating resistors $Z_0$ and are thus prevented from being reflected back toward the midpoints.

The time required for a digit pulse propagation from the midpoint of a digit conductor to the terminations is one-half that which would be required if the digit pulse were applied to one end of a digit conductor having the same number of memory elements linked thereby. This reduction by one-half in the propagation delay of digit pulses is important in achieving high speed operation of a memory arrangement because the digit lines in a practical memory are generally very long in proportion to the number of words that the memory is capable of storing.

In the reading out of stored information, a selective word line is supplied with a read current pulse which causes sense signals to be induced on the digit conductors 15 and 16 which are propagated in both directions from the memory elements linked by the selected word line. The two portions of the sense signal are propagated in opposite directions and terminated in the terminating resistors $Z_0$ at the ends of the conductor. The sense signals reaching the midpoints M of the conductors 15 and 16 are detected by the differential sense amplifier 20. The worst-case propagation delay of sense signals is one-half what it would be in the worst case if the sense amplifier were located at one end of a digit conductor pair having the same number of memory elements.

The disturbances due to reflections of signals on the digit conductors can be reduced by employing the optional resistors 36 and 37 at the midpoints of the digit conductors as shown in FIG. 3. These resistors may have a value as low as one-half the characteristic impedance of the digit lines. The use of resistors 36 and 37 have the undesirable effect of increasing the output requirements of the digit drivers and increasing the sensitivity requirements of the sense amplifier. Therefore, the resistors 36 and 37 are used only if, and to the extent, needed to reduce disturbing reflections that limit the speed and reliability of operation of the memory.

Figure 4:
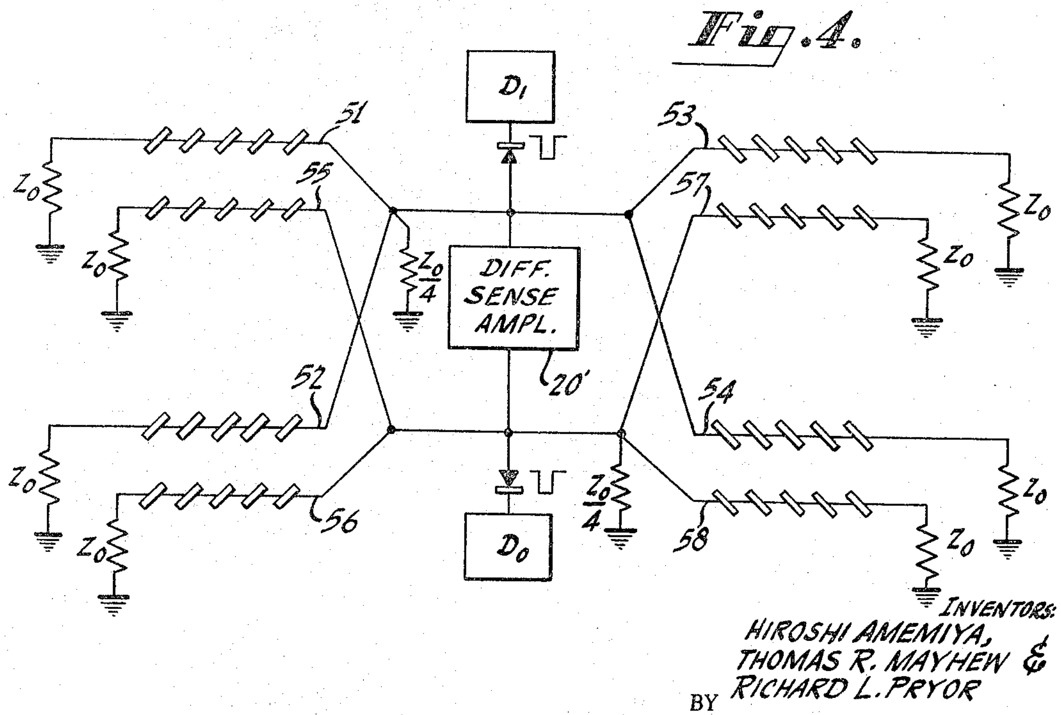
FIG. 4 is a diagram of the arrangement of digit conductor pairs in another embodiment of the invention.

FIG. 4 shows a digit-sense arrangement wherein the propagation delay is reduced to one-fourth of what it would be if the digit drivers and sense amplifier were connected to one end of a digit conductor pair linking the same number of magnetic elements. The digit driver $D_1$ is connected to supply pulses to all of digit conductors 51, 52, 53 and 54. The digit driver $D_0$ is connected to supply digit pulses to all of digit conductors 55, 56, 57 and 58. If driving point resistors $Z_0/4$ are used, they should have a value equal to or greater than one-fourth the characteristic impedance. The digit driver $D_1$ may be viewed as being connected to the midpoint of a single digit conductor 51, 53, and to the midpoints of another digit conductor 52, 54. On the other hand, the digit driver $D_1$ may be viewed as supplying digit pulses to one end of each of the digit conductors 51, 52, 53 and 54.

One digit conductor pair, such as 54, 58, may be omitted if it is desired to reduce the propagation delays by a factor of three, rather than four. In this case it is convenient to view the arrangement as one wherein the digit drivers and sense amplifier are connected to one end of each of the three remaining digit conductor pairs 51, 55; 52, 56; 53, 57. If driving point resistors are used to reduce disturbances due to reflections of signals on the digit conductors, these resistors each should have a value equal to or greater than one-third the characteristic impedance of the lines to which it is connected.

What is claimed is:

1. The combination of
a plurality of pairs of memory elements,
an equal plurality of word conductors each linking one of said pairs of memory elements,
a digit conductor pair including one digit conductor linking one memory element of each of said pairs of memory elements and another digit conductor linking the other memory element of each of said pairs of memory elements,
means terminating both ends of each of said digit conductors,
a differential sense amplifier having one input coupled to the midpoint of one of said digit conductors and having another input coupled to the midpoint of the other of said digit conductors, and
a digit driver also coupled to said midpoint of one of the digit conductors.

2. The combination of
a plurality of pairs of magnetic memory elements,
an equal plurality of word conductors each linking one of said pairs of memory elements,
a digit conductor pair including one digit conductor linking one memory element of each of said pairs of memory elements and another digit conductor linking the other memory element of each of said pairs of memory elements,
means terminating both ends of each of said digit conductors in the characteristic impedance of the line formed by the conductor,
a differential sense amplifier having one input coupled to the midpoint of one of said digit conductors and having another input coupled to the midpoint of the other of said digit conductors,
a "1" digit driver coupled to said midpoint of one of the digit conductors,
a "0" digit driver coupled to said midpoint of the other one of the digit conductors.

3. The combination of
a plurality of digit conductors arranged in pairs,
means terminating both ends of each of said digit conductors in the characteristic impedance of the line formed by the conductor,
memory element pairs each including one memory element linked by one conductor of a digit conductor pair and another memory element linked by the other conductor of said digit conductor pair,
a differential sense amplifier for each digit conductor pair and having one input coupled to the midpoint of one digit conductor of the respective digit conductor pair and having another input coupled to the midpoint of the other digit conductor of the digit conductor pair, and a digit driver for each digit conductor pair coupled to the midpoint of one digit conductor of the respective digit conductor pairs.

4. The combination of a plurality of digit conductors arranged in pairs, memory element pairs each including one memory element linked by one conductor of a digit conductor pair and another memory element linked by the other conductor of said digit conductor pair.

word conductors each linking both memory elements of a memory element pair, a differential sense amplifier for each digit conductor pair and having one input coupled to the midpoint of one digit conductor of the respective digit conductor pair and having another input coupled to the midpoint of the other digit conductor of the digit conductor pair, a "1" digit driver for each digit conductor pair coupled to the midpoint of one digit conductor of the pair, and a "0" digit driver for each digit conductor pair coupled to the midpoint of the other digit conductor of the pair.

5. The combination of a plurality of digit conductors arranged in pairs, means terminating one end of each of said digit conductors in the characteristic impedance of the line formed by the conductor, memory element pairs each including one memory element linked by one conductor of a digit conductor pair and another memory element linked by the other conductor of said digit conductor pair, word conductors each linking both memory element of a memory element pair, a differential sense amplifier having one input couple to the other end of one digit conductor of all of sai digit conductor pairs and having another input cou pled to the other end of the other digit conductor o all of said digit conductor pairs, a "1" digit driver coupled to said other end of one digi conductor of all of said digit conductor pairs, and a "0" digit driver coupled to said other end of the othe digit conductor of all of said digit conductor pairs.

References Cited by the Examiner

UNITED STATES PATENTS

| | | | |
|---|---|---|---|
| 3,181,131 | 4/1965 | Pryor et al. | 340—174 |
| 3,181,132 | 4/1965 | Amemiya | 340—174 |
| 3,209,337 | 9/1965 | Crawford | 340—174 |

OTHER REFERENCES

IBM Technical Disclosure Bulletin, vol. 3, No. 1, June 1960, page 45, "Memory Plane Having Combination Sense-Inhibit Winding," Constantine.

References Cited by the Applicant

FOREIGN PATENTS

| | | |
|---|---|---|
| 677,064 | 7/1958 | Canada. |
| 696,101 | 8/1959 | Canada. |
| 701,684 | 1/1961 | Canada. |

BERNARD KONICK, *Primary Examiner.*

L. G. KURLAND, *Assistant Examiner.*